UNITED STATES PATENT OFFICE.

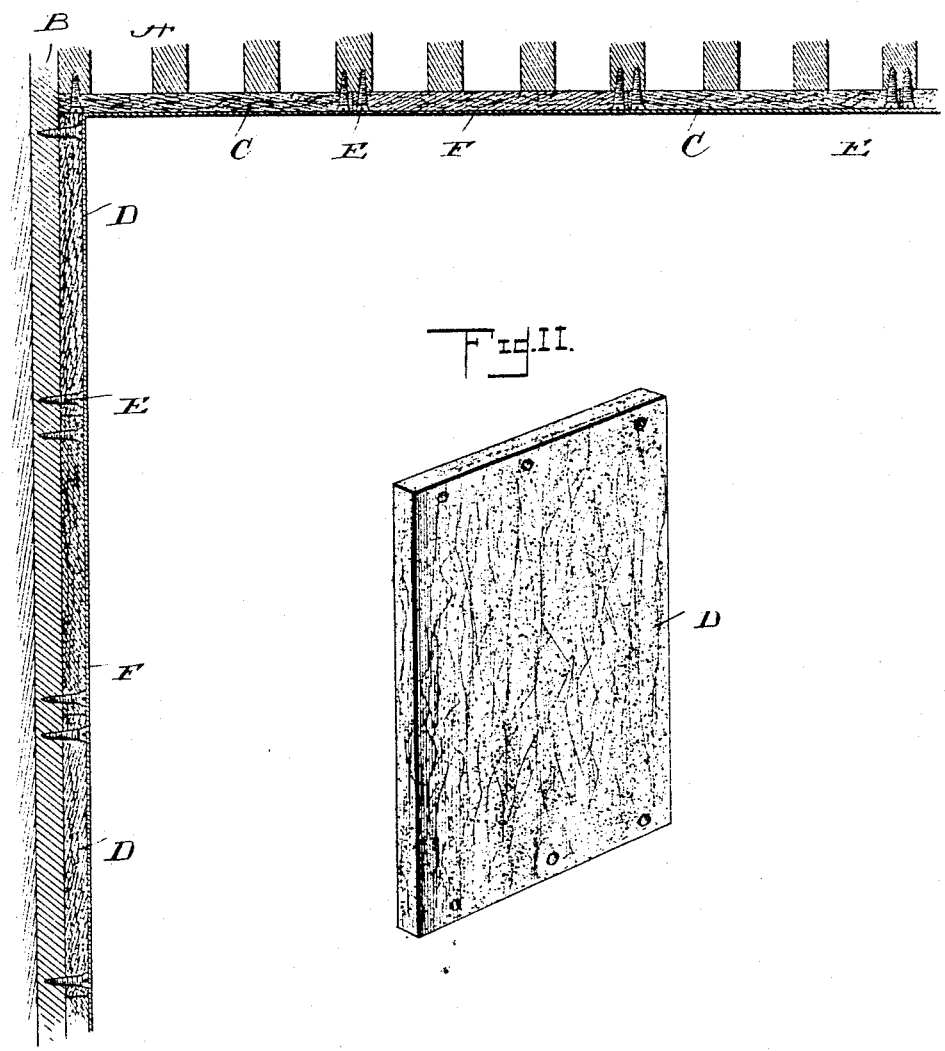
(No Model.)
J. H. GLENN.
COMPOSITION FOR PLASTER.
No. 514,357.  Patented Feb. 6, 1894.
Witnesses
Inventor
John Henry Glenn
By his Attorneys
Knight Bros

JOHN HENRY GLENN, OF HARRIMAN, TENNESSEE, ASSIGNOR OF TWO-THIRDS TO GEORGE GEARING KURTZ, OF SAME PLACE, AND JOHN HENRY KURTZ, OF SHENANDOAH, PENNSYLVANIA.

COMPOSITION FOR PLASTER.

SPECIFICATION forming part of Letters Patent No. 514,357, dated February 6, 1894.

Application filed February 20, 1892. Serial No. 422,267. (No specimens.)

*To all whom it may concern:*

Be it known that I, JOHN HENRY GLENN, a citizen of the United States, residing at Harriman, in the county of Roane and State of Tennessee, have invented a certain new and useful Improvement in a Composition for Plaster, of which the following is a specification.

My invention relates to an improved composition for plaster compound for the formation or manufacture therefrom of solid plaster slabs or sheets, for application to the walls and ceilings of buildings by means of nails, screws or other fastenings as hereinafter described. I produce such a composition by a mixture of plaster of paris, saw-dust (preferably oak and pine) magnesia and cement, in suitable proportions mingled in a dry state, together with a suitable binding material, after which sufficient water is added, and the composition allowed to stand until the chemical action ensues and forms a calcium silicate. At that stage it is run into molds and pressed therein until hard.

The cement which I prefer to employ is composed of the following ingredients; viz., sixty-six parts of carbonate of lime, eighteen parts of silica, nine parts of alumina, and seven parts of protoxide of iron. The binding material I employ at present is sedge grass, which is very abundant in the Southern States and operates with good effect for the purpose. The sheets or plates having been molded in the required form and dimensions, are allowed to set and are then dried in kilns at suitable temperature.

I prefer to mold the composition in sheets or plates four or five feet long by one or two feet wide and from three-fourths to seven-eighths of an inch thick according to the purpose and place to which they are to be applied. For ceilings the sheets are made still thinner.

My invention produces a sheet of plaster made and thoroughly dried before applying it to the building, and when applied it is fastened to the joists or studdings with nails, screws or staples as illustrated in the accompanying drawings, in which—

Figure I is a vertical section of a part of the wall and ceiling of a building with my improved plaster applied. Fig. II is a view of one of my composite plaster slabs.

A, B, represent the joists and studding, C the plaster plates applied to the ceiling, D the plates applied to the wall, and E, E, the fasteners by which they are secured. If desired a superficial finish may be made by an application of a thin white coat F as with ordinary plastered walls and ceilings.

My invention possesses great superiority over the ordinary mode of plastering in that the plaster is produced and completely manufactured in the factory and thoroughly dried before applying it to the building. It can be applied as well in the most severe freezing weather as in warm weather, when only, ordinary plastering can be done.

My improved plaster is also highly advantageous in that it weighs only a fraction, say, one-third as much as the ordinary lime and sand plaster, thus relieving the building of great weight. It also serves as a very substantial brace to the entire building.

A further advantage of my improved plaster is that it will not crack or scale, for the reason that the substance of the sheets is homogeneous and tough, and all shrinkage is completed in the kiln before the plaster is used or applied. It saves much time in completing buildings and putting them in habitable condition and is moreover superior to other plastering on hygienic grounds, for the reason that it is entirely free from dampness and it is pure and odorless, having no animal matter in its composition. It is also advantageous in the facility afforded for producing ornamental walls and ceilings in any designs.

Having thus fully described my invention, the following is what I claim as new therein and desire to secure by Letters Patent:

A plaster composition composed of plaster of paris, saw-dust, magnesia, cement, and a suitable binding material; said cement consisting of carbonate of lime, silica, alumina, and protoxide of iron, as set forth.

JOHN HENRY GLENN.

Witnesses:
FRANK P. EBERT,
R. B. CASSELL.